US011081762B2

(12) United States Patent
Song et al.

(10) Patent No.: US 11,081,762 B2
(45) Date of Patent: Aug. 3, 2021

(54) ELECTRODE ASSEMBLY AND LITHIUM SECONDARY BATTERY INCLUDING THE SAME

(71) Applicant: LG CHEM, LTD., Seoul (KR)

(72) Inventors: Joo-Yong Song, Daejeon (KR); Myung-Ki Lee, Daejeon (KR); Ji-Hee Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 158 days.

(21) Appl. No.: 16/478,764

(22) PCT Filed: Jun. 21, 2018

(86) PCT No.: PCT/KR2018/007033
§ 371 (c)(1),
(2) Date: Jul. 17, 2019

(87) PCT Pub. No.: WO2019/004655
PCT Pub. Date: Jan. 3, 2019

(65) Prior Publication Data
US 2020/0052276 A1 Feb. 13, 2020

(30) Foreign Application Priority Data
Jun. 27, 2017 (KR) ........................ 10-2017-0081480

(51) Int. Cl.
*H01M 4/04* (2006.01)
*H01M 50/46* (2021.01)
(Continued)

(52) U.S. Cl.
CPC ......... *H01M 50/46* (2021.01); *H01M 4/0433* (2013.01); *H01M 4/139* (2013.01);
(Continued)

(58) Field of Classification Search
CPC .... H01M 50/00; H01M 50/46; H01M 10/052; H01M 4/04; H01M 4/75
See application file for complete search history.

(56) References Cited

U.S. PATENT DOCUMENTS

| 8,962,190 B1 | 2/2015 | Gross et al. |
| 2010/0003599 A1 | 1/2010 | Nonoshita et al. |

(Continued)

FOREIGN PATENT DOCUMENTS

| JP | 2008-77969 A | 4/2008 |
| JP | 2008-311171 A | 12/2008 |

(Continued)

OTHER PUBLICATIONS

Machine Translation of: KR 1020160004737, Chang et al., Jan. 13, 2016.*

(Continued)

*Primary Examiner* — Kenneth J Douyette
(74) *Attorney, Agent, or Firm* — Birch, Stewart, Kolasch & Birch LLP

(57) ABSTRACT

An electrode assembly having a positive electrode current collector, a positive electrode active material layer, a separator, a negative electrode active material layer and a negative electrode current collector stacked successively in a thickness direction of the electrode assembly is provided. A plurality of through-holes is formed to pass through the positive electrode active material layer, separator and the negative electrode active material layer. The positive electrode current collector includes a first sheet shaped current collector and a plurality of first column shaped current collectors extending from the first sheet shaped current collector along the thickness direction of the electrode assembly. The negative electrode current collector includes a second sheet shaped current collector and a plurality of second column shaped current collectors extending from the (Continued)

second sheet shaped current collector along the thickness direction of the electrode assembly.

15 Claims, 4 Drawing Sheets

(51) Int. Cl.
    H01M 4/139      (2010.01)
    H01M 4/75       (2006.01)
    H01M 10/052     (2010.01)
    H01M 10/0585    (2010.01)
    H01M 50/463     (2021.01)

(52) U.S. Cl.
    CPC .......... H01M 4/75 (2013.01); H01M 10/052 (2013.01); H01M 10/0585 (2013.01); H01M 50/463 (2021.01); H01M 2220/20 (2013.01); H01M 2220/30 (2013.01)

(56) References Cited

U.S. PATENT DOCUMENTS

| | | |
|---|---|---|
| 2010/0209784 A1 | 8/2010 | Yamazaki et al. |
| 2012/0021280 A1 | 1/2012 | Katase et al. |
| 2013/0084495 A1 | 4/2013 | Tajima et al. |
| 2013/0164612 A1 | 6/2013 | Tanemura et al. |
| 2013/0236781 A1 | 9/2013 | Oguni et al. |

FOREIGN PATENT DOCUMENTS

| | | |
|---|---|---|
| JP | 2009-76289 A | 4/2009 |
| JP | 2011-151279 A | 8/2011 |
| JP | 2012-59396 A | 3/2012 |
| JP | 2013-149604 A | 8/2013 |
| JP | 2013-182810 A | 9/2013 |
| JP | 2013-206705 A | 10/2013 |
| JP | 2013-214501 A | 10/2013 |
| JP | 2015-195144 A | 11/2015 |
| KR | 10-2007-0037209 A | 4/2007 |
| KR | 10-2013-0035894 A | 4/2013 |
| KR | 10-2015-0047661 A | 5/2015 |
| KR | 10-2016-0004737 A | 1/2016 |
| KR | 10-2016-0050403 A | 5/2016 |

OTHER PUBLICATIONS

International Search Report issued in PCT/KR2018/007033 (PCT/ISA/210), dated Oct. 11, 2018.

\* cited by examiner

ELECTRODE ASSEMBLY AND LITHIUM SECONDARY BATTERY INCLUDING THE SAME

CROSS-REFERENCE TO RELATED APPLICATIONS

The present application claims priority to Korean Patent Application No. 10-2017-0081480 filed on Jun. 27, 2017 in the Republic of Korea, the disclosures of which are incorporated herein by reference.

TECHNICAL FIELD

The present disclosure relates to an electrode assembly and a lithium secondary battery including the same. More particularly, the present disclosure relates to an electrode assembly including a positive electrode, a separator and a negative electrode stacked in a novel shape, and a lithium secondary battery including the same.

BACKGROUND ART

Recently, energy storage technology has been given increasing attentions. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Particularly, electronic instruments have been downsized and lightened recently, development of secondary batteries as batteries amenable to downsizing and lightening and capable of being charged/discharged with high capacity has been focused.

Secondary batteries having improved performance, particularly output, have been developed continuously through the use of an electrode active material. Among the commercially available secondary batteries, lithium secondary batteries developed in the early 1990's have been spotlighted, since they have a higher driving voltage and significantly higher energy density as compared to conventional batteries, such as Ni-MH batteries.

Such a lithium secondary battery includes a positive electrode, a separator, a negative electrode and an electrolyte. Lithium ions deintercalated from a positive electrode active material upon the first charge are intercalated into a negative electrode active material, such as carbon particles, and then deintercalated again therefrom upon discharge. In this manner, lithium ions function to transfer energy, while they reciprocate between both electrodes, and thus the lithium secondary battery is rechargeable.

As technological development and a need for mobile instruments have increased, a demand for secondary batteries as energy sources has increased rapidly. Among such secondary batteries, lithium secondary batteries having high energy density and voltage, long cycle life and a low self-discharging rate have been commercialized and used widely. In addition, as the attention to environmental problems has increased, there has been grown the market of systems using a high-capacity battery, such as electric vehicles and hybrid electric vehicles capable of substituting for vehicles using fossil fuel, including gasoline vehicles and diesel vehicles, one of the main causes of air pollution. In addition, as a power source for such systems, there is a need for designing a high-capacity electrode for manufacturing a lithium secondary battery having high energy density, high output and high discharge voltage.

Meanwhile, there has been an attempt to provide a high-loading electrode (loading amount: about 6 $mAh/cm^2$ or more) having a large electrode thickness by increasing the amount of an electrode active material for the purpose of designing an electrode with high capacity. However, when such a high-loading electrode is to be realized, there are problems in that cracking occurs at a coating portion due to high loading, non-uniform loading occurs due to the viscosity of an electrode active material slurry and separation of an electrode active material occurs during the winding of the electrode.

DISCLOSURE

Technical Problem

The present disclosure is designed to solve the problems of the related art, and therefore the present disclosure is directed to providing an electrode assembly having a novel shape capable of preventing cracking and separation of an electrode active material layer and a lithium secondary battery including the same.

Technical Solution

In one aspect of the present disclosure, there is provided an electrode assembly including a positive electrode current collector, a positive electrode active material layer, a separator, a negative electrode active material layer and a negative electrode current collector stacked successively in a thickness direction of the electrode assembly, wherein a plurality of through-holes is formed to pass through the positive electrode active material layer, separator and the negative electrode active material layer, the positive electrode current collector includes a first sheet shaped current collector and a plurality of first column shaped current collectors extending from the first sheet shaped current collector along the thickness direction of the electrode assembly and passing through a first group of through-holes of the plurality of through holes, and the negative electrode current collector includes a second sheet shaped current collector and a plurality of second column shaped current collectors extending from the second sheet shaped current collector along the thickness direction of the electrode assembly and passing through the second group of through-holes of the plurality of through holes other than the first group of through-holes.

Herein, the first column shaped current collectors may be formed such that they extend along the thickness direction of the electrode assembly to reach the second sheet shaped current collector.

In addition, the second column shaped current collectors may be formed such that they extend along the thickness direction of the electrode assembly to reach the first sheet shaped current collector.

Meanwhile, the first column shaped current collectors may pass through the first group of through-holes formed in the positive electrode active material layer while being in contact with inner circumferential surfaces thereof, and the second column shaped current collectors may pass through the second group of through-holes formed in the negative electrode active material layer while being in contact with inner circumferential surfaces thereof.

Herein, the first column shaped current collectors may pass through the first group of through-holes formed in the negative electrode active material layer while being spaced apart from the inner circumferential surfaces thereof, and the second column shaped current collectors may pass through the second group of through-holes formed in the positive electrode active material layer while being spaced apart from the inner circumferential surfaces thereof.

In addition, the first column shaped current collectors may pass through the first group of through-holes formed in the negative electrode active material layer while being in contact with the inner circumferential surfaces thereof, the second column shaped current collectors may pass through the second group of through-holes formed in the positive electrode active material layer while being in contact with the inner circumferential surfaces thereof, each of the first column shaped current collectors includes a first insulation layer formed on a surface of a portion thereof where they are in contact with the negative electrode active material layer, and each of the second column shaped current collectors includes a second insulation layer formed on a surface of a portion thereof where they are in contact with the positive electrode active material layer.

Herein, each of the first insulation layer and the second insulation layer may be independently a varnish coating layer, insulating polymer coating layer or an insulating inorganic coating layer.

Meanwhile, the first group of through-holes through which the first column shaped current collectors pass and the second group of through-holes through which the second column shaped current collectors pass may be disposed alternately with each other.

In addition, the positive electrode active material layer in which the plurality of through-holes are formed may be obtained by introducing a positive electrode active material slurry to an electrode mold having a plurality of columns, and then heating and compressing the positive electrode active material slurry.

In addition, the negative electrode active material layer in which the plurality of through-holes are formed may be obtained by introducing a negative electrode active material slurry to an electrode mold having a plurality of columns, and then heating and compressing the negative electrode active material slurry.

In another aspect of the present disclosure, there is also provided a lithium secondary battery including the electrode assembly according to the present disclosure.

Advantageous Effects

According to the present disclosure, column-like current collectors pass through a plurality of through-holes formed in electrode active material layers to provide an electrode assembly. Thus, it is possible to produce an electrode assembly having a rigid block shape.

In addition, a positive electrode current collector, a positive electrode active material layer, a negative electrode active material layer and a negative electrode current collector are stacked in a block shape to produce an electrode assembly. Thus, it is possible to reduce the processing cost.

Further, the column-like current collectors passing through the electrode active material layers are in close contact with the inner circumferential surfaces of the through-holes formed in the electrode active material layers. Thus, it is possible to reduce the internal resistance of the electrode.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
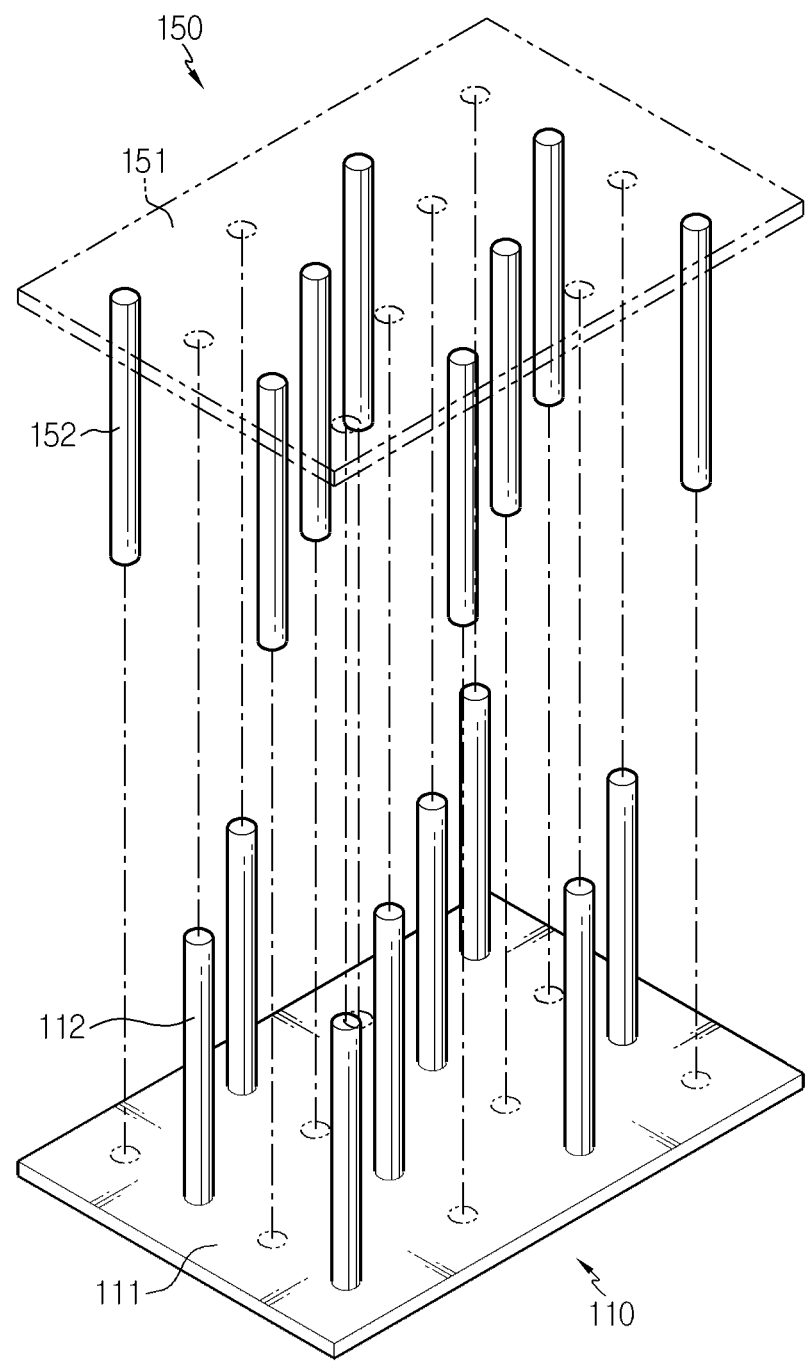
FIG. 1 is a schematic view illustrating a positive electrode current collector and a negative electrode current collector according to an embodiment of the present disclosure.
Figure 2:
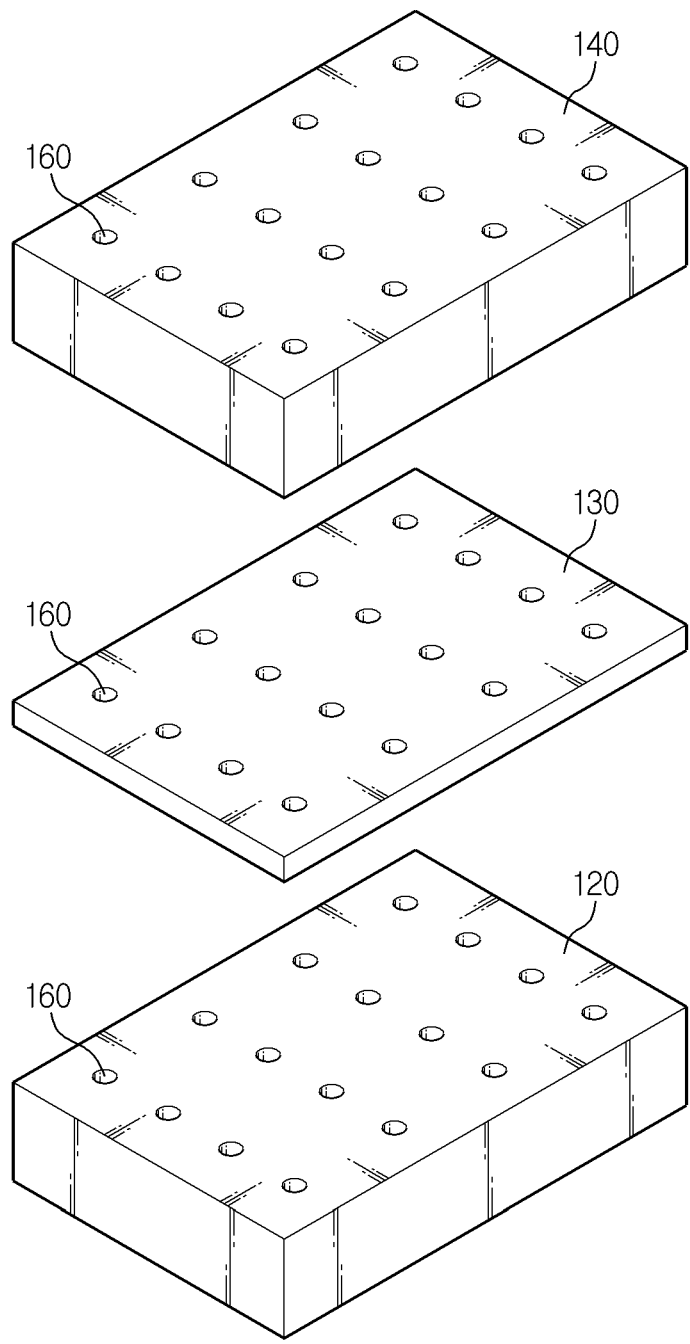
FIG. 2 is a schematic view illustrating a positive electrode active material layer, separator and a negative electrode active material layer having a plurality of through-holes according to an embodiment of the present disclosure.
Figure 3:
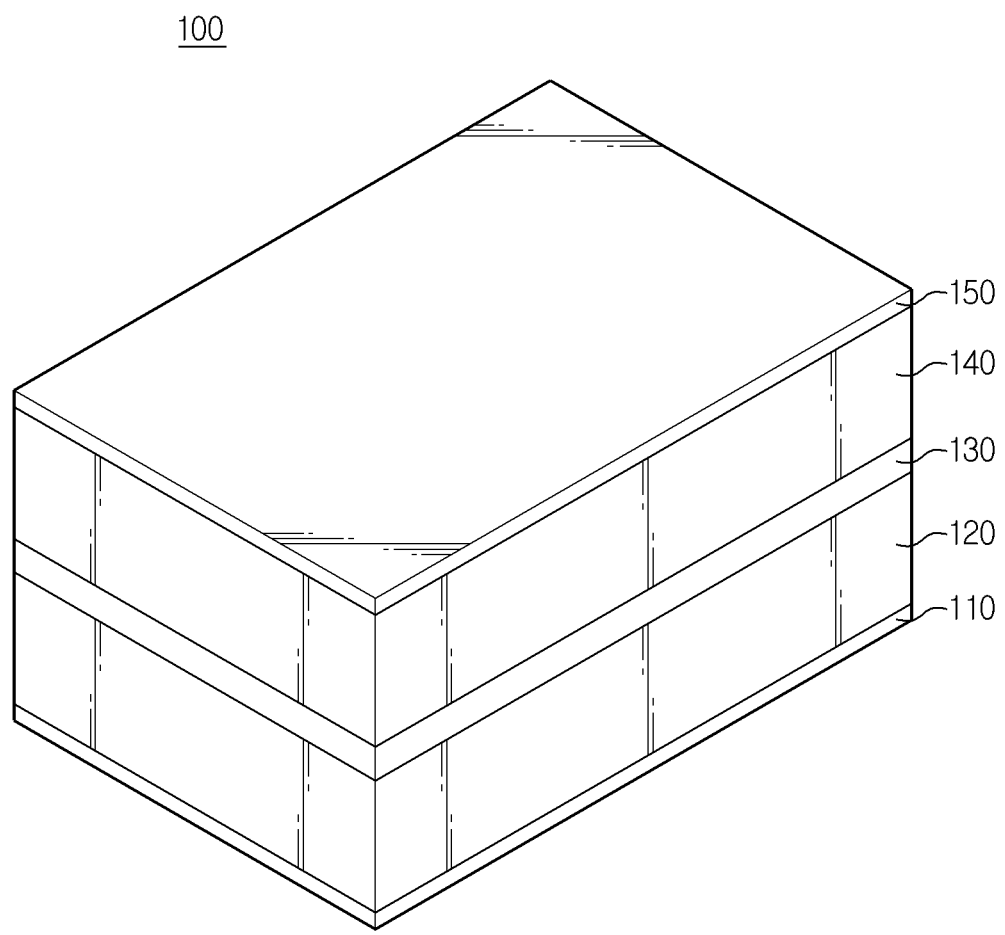
FIG. 3 is a schematic view illustrating the electrode assembly obtained according to an embodiment of the present disclosure.

FIG. 1 is a schematic view illustrating a positive electrode current collector and a negative electrode current collector according to an embodiment of the present disclosure, FIG. 2 is a schematic view illustrating a positive electrode active material layer, separator and a negative electrode active material layer having a plurality of through-holes according to an embodiment of the present disclosure, and FIG. 3 is a schematic view illustrating the electrode assembly obtained according to an embodiment of the present disclosure.

Referring to FIG. 1 to FIG. 3, the electrode assembly 100 according to an embodiment of the present disclosure is an electrode assembly 100 including a positive electrode current collector 110, a positive electrode active material layer 120, a separator 130, a negative electrode active material layer 140 and a negative electrode current collector 150 stacked successively, wherein a plurality of through-holes 160 is formed to pass through the positive electrode active material layer 120, separator 130 and the negative electrode active material layer 140, the positive electrode current collector 110 includes a first sheet-like current collector 111 and a plurality of first column-like current collectors 112 extended from the first sheet-like current collector 111 along the thickness direction of the electrode assembly 100 and passing through a part of the through-holes 160, and the negative electrode current collector 150 includes a second sheet-like current collector 151 and a plurality of second column-like current collectors 152 extended from the second sheet-like current collector 151 along the thickness direction of the electrode assembly 100 and passing through the remaining through-holes other than the part of the through-holes 160.

According to the related art, an electrode assembly generally includes a positive electrode having a sheet-like positive electrode current collector and a positive electrode active material layer formed thereon, and a negative electrode including a sheet-like negative electrode current collector and a negative electrode active material layer formed thereon, stacked simply with a sheet-like separator interposed therebetween.

When a high-loading electrode having a large electrode thickness is provided from the conventional electrode assembly by increasing the amount of electrode active materials in order to design a high-capacity electrode, some problems, such as cracking at a coating portion caused by high loading, non-uniform loading caused by the viscosity of an electrode active material slurry and separation of an electrode active material layer during the winding of an electrode, occur undesirably.

However, according to the present disclosure, the column-like current collectors 112, 152 pass through the through-holes 160 formed in the electrode active material layers 120, 140 and the separator to provide the electrode assembly. Therefore, it is possible to produce an electrode assembly in the form of a rigid block.

In addition, it is possible to reduce the processing cost, since each of the preliminarily formed block-shaped positive electrode current collector 110, positive electrode active material layer 120, separator 130, negative electrode active material layer 140 and negative electrode current collector 150 are stacked successively to produce the electrode assembly 100.

Herein, the first column-like current collectors 112 may be formed in such a manner that they pass through the through-holes 160, are extended along the thickness direction of the electrode assembly 100 and reach the second sheet-like current collector 151 of the counter electrode. The second column-like current collectors 152 may be formed in such a manner that they pass through the through-holes 160, are extended along the thickness direction of the electrode assembly 100 and reach the first sheet-like current collector 111 of the counter electrode.

In this case, in order to prevent a short-circuit between both electrodes, an insulation layer may be formed at the portion where the first column-like current collectors 112 are in contact with the second sheet-like current collector 151 and at the portion where the second column-like current collectors 152 are in contact with the first sheet-like current collector 111 to interrupt electrical connection.

Meanwhile, the first column-like current collectors 112 may pass through the through-holes 160 formed in the positive electrode active material layer 120 while being in close contact with the inner circumferential surfaces thereof. In addition, the second column-like current collectors 152 may pass through the through-holes 160 formed in the negative electrode active material layer 140 while being in close contact with the inner circumferential surfaces thereof. Therefore, it is possible to increase the area where each electrode current collector is in contact with each electrode active material layer, and thus to reduce the internal resistance of each electrode.

Herein, in order to prevent a short-circuit between both electrodes, the first column-like current collectors 112 may be in close contact with the inner circumferential surfaces of the through-holes 160 formed in the positive electrode active material layer 120, but may pass through the through-holes 160 formed in the negative electrode active material layer 140 while being spaced apart from the inner circumferential surfaces thereof. The second column-like current collectors 152 may be in close contact with the inner circumferential surfaces of the through-holes 160 formed in the negative electrode active material layer 140, but may pass through the through-holes 160 formed in the positive electrode active material layer 120 while being spaced apart from the inner circumferential surfaces thereof.

In addition, the first column-like current collectors 112 may pass through the through-holes 160 formed in the positive electrode active material layer 120 while being in close contact with the inner circumferential surfaces thereof and may pass through the through-holes 160 formed in the negative electrode active material layer 140 while being in close contact with the inner circumferential surfaces thereof. In addition, the second column-like current collectors 152 may pass through the through-holes 160 formed in the negative electrode active material layer 140 while being in close contact with the inner circumferential surfaces thereof and may pass through the through-holes 160 formed in the positive electrode active material layer 120 while being in close contact with the inner circumferential surfaces thereof. Herein, in order to prevent a short-circuit between both electrodes, the first column-like current collectors 112 may include a first insulation layer formed on the surface of the portion where they are in contact with the negative electrode active material layer 140, and the second column-like current collectors 152 may include a second insulation layer formed on the surface of the portion where they are in contact with the positive electrode active material layer 120.

Herein, each of the first insulation layer and the second insulation layer may independently include a varnish coating layer, insulating polymer coating layer or an insulating inorganic coating layer.

Meanwhile, referring to the arrangement of a part of the through-holes through which the first column-like current collectors pass and the remaining through-holes through which the second column-like current collectors pass, the part of the through-holes and the remaining through-holes may be disposed with no particular limitation and may be disposed independently as a separate group at one portion. In a variant, the part of the through-holes and the remaining through-holes may be disposed alternately with each other. In this manner, force may be applied uniformly to the first column-like current collector and to the second column-like current collectors. Thus, it is possible to assembly a more rigid electrode assembly.

Figure 4:
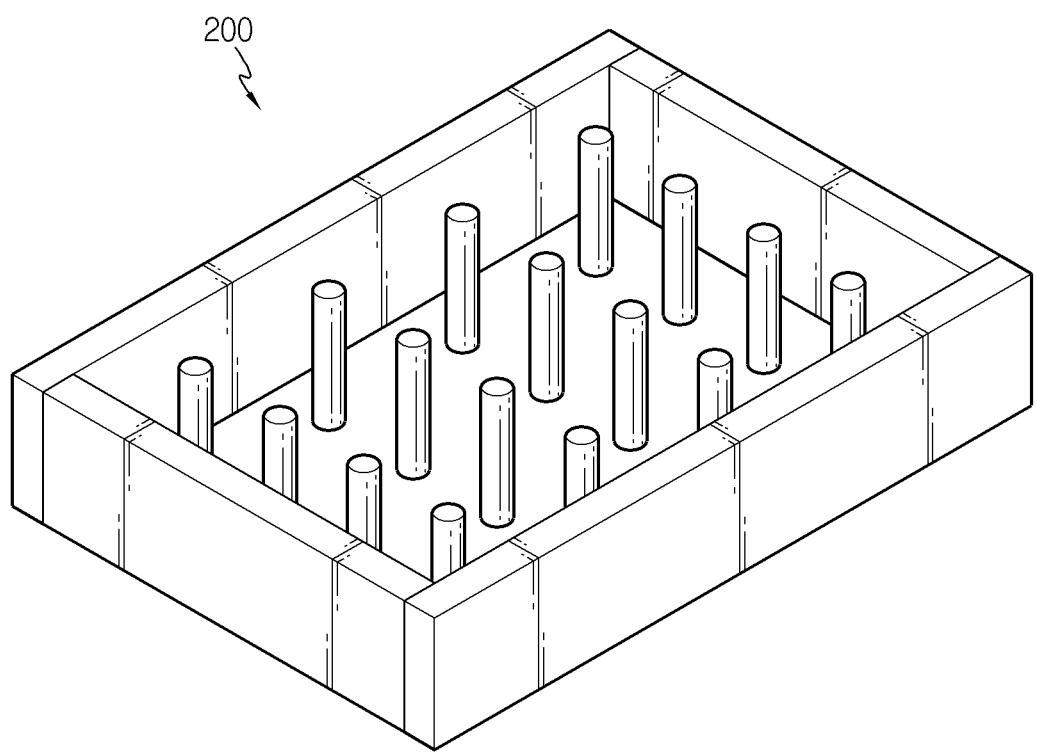
FIG. 4 is a schematic view illustrating an electrode mold configured to form an electrode active material layer according to an embodiment of the present disclosure.

FIG. 4 is a schematic view illustrating an electrode mold configured to form an electrode active material layer according to an embodiment of the present disclosure.

Referring to FIG. 4, the electrode active material layer having a plurality of through-holes according to the present disclosure may be a product obtained by introducing an electrode active material slurry to an electrode mold 200 having a plurality of columns, and then heating and compressing the electrode active material slurry.

When a block-shaped electrode active material layer is obtained through an electrode mold, it may be stored merely by stacking without winding for storage. Thus, it is possible to fundamentally prevent separation of an electrode active material layer, which, otherwise, may occur when an electrode sheet is wound for storage according to the related art.

Herein, the positive electrode active material slurry according to the present disclosure is prepared by mixing a positive electrode active material, a conductive material, a binder and a solvent.

The positive electrode active material may include a lithium-containing oxide, and a lithium-containing transition metal oxide may be used preferably. For examples, it is possible to use any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0<y<1), $Li_xNi_{1-y}Mn_yO_2$ (0.5<x<1.3, 0<y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), or a combination of two or more of them. The lithium-containing transition metal oxide may be coated with a metal, such as aluminum (Al), or metal oxide. It is also possible to use a sulfide, selenide and halide, besides the lithium-containing transition metal oxide.

The conductive material is not particularly limited, as long as it is an electroconductive material causing no chemical change in an electrochemical device. In general, the conductive material that may be used includes carbon black, graphite, carbon fibers, carbon nanotubes, metal powder, conductive metal oxide, inorganic conductive material, or the like. Particular examples of commercially available conductive materials include acetylene black series (available from Chevron Chemical Company or Gulf Oil Company), Ketjen Black EC series (available from Armak Company), Vulcan XC-72 (available from Cabot Company) and Super P (available from MMM Company). For example, it is possible to use acetylene black, carbon black, graphite, or the like.

In addition, the negative electrode active material slurry according to the present disclosure is prepared by mixing a negative electrode active material, a conductive material, a binder and a solvent.

In general, the negative electrode active material may include lithium metal, a carbonaceous material, metal compound or a combination thereof, which is capable of lithium ion intercalation/deintercalation.

Particular examples of the carbonaceous material may include low-crystalline carbon and high-crystalline carbon. Typical examples of low-crystalline carbon include soft carbon and hard carbon, and those of high-crystalline carbon include natural graphite, Kish graphite, pyrolytic carbon, mesophase pitch based carbon fibers, meso-carbon microbeads, mesophase pitches and high-temperature baked carbon, such as petroleum or coal tar pitch derived cokes.

Particular examples of the metal compound include compounds containing at least one of metal elements, such as Si, Ge, Sn, Pb, P, Sb, Bi, Al, Ga, In, Ti, Mn, Fe, Co, Ni, Cu, Zn, Ag, Mg, Sr and Ba. The metal compound may be used in any form, such as simple substance, alloy, oxide ($TiO_2$, $SnO_2$, or the like), nitride, sulfide, boride or alloy with lithium. However, it is possible to impart high capacity to simple substance, alloy, oxide and alloy with lithium. Among them, a metal compound that may contain at least one element selected from Si, Ge and Sn and includes at least one element selected from Si and Sn may provide a battery with higher capacity.

The binder used for the positive electrode and the negative electrode functions to connect positive electrode active material particles and negative electrode active material particles among themselves. It is possible to use a conventional binder with no particular limitation.

For example, it is possible to use various types of binders, such as polyvinylidene fluoride-co-hexafluoropropylene (PVDF-co-HFP), polyvinylidene fluoride (PVDF), polyacrylonitrile, polymethyl methacrylate, styrene butadiene rubber (SBR) and carboxymethyl cellulose (CMC).

Meanwhile, each of the positive electrode current collector and the negative electrode current collector may be any highly conductive metal that has no reactivity in the voltage range of the corresponding battery. Particularly, non-limiting examples of the positive electrode current collector include foil made of aluminum, nickel or a combination thereof. Non-limiting examples of the negative electrode current collector include foil made of copper, gold, nickel, copper alloy or a combination thereof. In addition, the current collector may include stacked substrates made of such materials.

In addition, the separator according to the present disclosure may be any porous polymer substrate used for a conventional electrochemical device. For example, the separator may include a polyolefin-based porous polymer membrane or non-woven web, but is not limited thereto.

Particular examples of the polyolefin-based porous polymer membrane include membranes formed of any one of polyolefin polymers, such as polyethylene, including high-density polyethylene, linear low-density polyethylene, low-density polyethylene and ultrahigh-molecular weight polyethylene, polypropylene, polybutylene and polypentene, or a polymer blend thereof.

Particular examples of the non-woven web include a non-woven web formed of any one of polyethylene terephthalate, polybutylene terephthalate, polyester, polyacetal, polyamide, polycarbonate, polyimide, polyetheretherketone, polyethersulfone, polyphenylene oxide, polyphenylene sulfide and polyethylene naphthalate, or a polymer blend thereof, in addition to a polyolefin-based non-woven web. The non-woven web may have a structure of a spun-bonded non-woven web including long fibers or a melt blown non-woven web.

There is no particular limitation in the thickness of the porous polymer substrate, but the porous polymer substrate may have a thickness of 5-50 μm. Although the pore size and porosity of the pores present in the porous polymer substrate are not particularly limited, the pore size and porosity may be 0.01-50 μm and 10-95%, respectively.

Meanwhile, the electrode assembly according to the present disclosure may be used for manufacturing an electrochemical device. Herein, the electrochemical device includes any device which carries out electrochemical reaction, and particular examples thereof include all types of secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer ion batteries, are preferred.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

DESCRIPTION OF DRAWING NUMERALS

100: Electrode assembly
110: Positive electrode current collector
111: First sheet-like current collector
112: First column-like current collector
120: Positive electrode active material layer
130: Separator
140: Negative electrode active material layer 150: Negative electrode current collector
151: Second sheet-like current collector
152: Second column-like current collector
160: Through-holes
200: Electrode mold

What is claimed is:

1. An electrode assembly comprising a positive electrode current collector, a positive electrode active material layer, a separator, a negative electrode active material layer and a negative electrode current collector stacked successively in a thickness direction of the electrode assembly,
wherein a plurality of through-holes is formed to pass through the positive electrode active material layer, separator and the negative electrode active material layer,
the positive electrode current collector comprises a first sheet shaped current collector and a plurality of first column shaped current collectors extending from the first sheet shaped current collector along the thickness direction of the electrode assembly and passing through a first group of through-holes of the plurality of through holes, and
the negative electrode current collector comprises a second sheet shaped current collector and a plurality of second column shaped current collectors extending from the second sheet shaped current collector along the thickness direction of the electrode assembly and passing through a second group of through-holes of the plurality of through holes other than the first group of through-holes.

2. The electrode assembly according to claim 1, wherein the first column shaped current collectors are formed such that they extend along the thickness direction of the electrode assembly to reach the second sheet shaped current collector.

3. The electrode assembly according to claim 1, wherein the second column shaped current collectors are formed such that they extend along the thickness direction of the electrode assembly to reach the first sheet shaped current collector.

4. The electrode assembly according to claim 1, wherein the first column shaped current collectors pass through the first group of through-holes formed in the positive electrode active material layer while being in contact with inner circumferential surfaces thereof, and
the second column shaped current collectors pass through the second group of through-holes formed in the negative electrode active material layer while being in contact with inner circumferential surfaces thereof.

5. The electrode assembly according to claim 4, wherein the first column shaped current collectors pass through the first group of through-holes formed in the negative electrode active material layer while being spaced apart from the inner circumferential surfaces thereof, and
the second column shaped current collectors pass through the second group of through-holes formed in the positive electrode active material layer while being spaced apart from the inner circumferential surfaces thereof.

6. The electrode assembly according to claim 4, wherein the first column shaped current collectors pass through the first group of through-holes formed in the negative electrode active material layer while being in contact with the inner circumferential surfaces thereof,
the second column shaped current collectors pass through the second group of through-holes formed in the positive electrode active material layer while being in contact with the inner circumferential surfaces thereof,
each of the first column shaped current collectors comprises a first insulation layer formed on a surface of a portion thereof where they are in contact with the negative electrode active material layer, and
each of the second column shaped current collectors comprises a second insulation layer formed on a surface of a portion thereof where they are in contact with the positive electrode active material layer.

7. The electrode assembly according to claim 6, wherein each of the first insulation layer and the second insulation layer is independently a varnish coating layer, insulating polymer coating layer or an insulating inorganic coating layer.

8. The electrode assembly according to claim 1, wherein the first group of through-holes through which the first column shaped current collectors pass and the second group of through-holes through which the second column shaped current collectors pass are disposed alternately with each other.

9. The electrode assembly according to claim 1, wherein the positive electrode active material layer in which the plurality of through-holes are formed obtained by introducing a positive electrode active material slurry to an electrode mold having a plurality of columns, and then heating and compressing the positive electrode active material slurry.

10. The electrode assembly according to claim 1, wherein the negative electrode active material layer in which the plurality of through-holes are formed is obtained by introducing a negative electrode active material slurry to an electrode mold having a plurality of columns, and then heating and compressing the negative electrode active material slurry.

11. A lithium secondary battery comprising the electrode assembly as defined in claim 1.

12. The electrode assembly of claim 1, wherein the positive electrode material layer has a block shape.

13. The electrode assembly of claim 1, wherein the negative electrode material layer has a block shape.

14. The electrode assembly of claim 1, wherein the first column shaped current collectors extend beyond the positive electrode active material layer.

15. The electrode assembly of claim 1, wherein the second column shaped current collectors extend beyond the negative electrode active material layer.

* * * * *